3,304,313
2 - (N-PHTHALIMIDOACETYL - N - CYCLOALKYL-METHYL) - AMINOBENZOPHENONE DERIVATIVES
Freeman H. McMillan, Dover, and Ian Pattison, Denville, N.J., assignors to Warner-Lambert Pharmaceutical Company, Morris Plains, N.J., a corporation of Delaware
No Drawing. Original application Mar. 1, 1963, Ser. No. 262,221, now Patent No. 3,192,199, dated June 29, 1965. Divided and this application Jan. 21, 1965, Ser. No. 427,141
2 Claims. (Cl. 260—326)

This application is a divisional application of Serial No. 262,221, filed March 1, 1963, now U.S. Patent No. 3,192,199.

This invention relates to a new and novel process for the production of substituted 1,4-benzodiazepines of the formula:

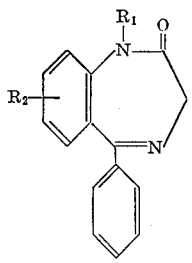

wherein $R_1$ represents a cycloalkylmethyl group such as cyclopropylmethyl, cyclobutylmethyl or cyclopentylmethyl and $R_2$ represents hydrogen, lower alkyl, lower alkoxy or halogen such as chlorine or bromine.

This invention also relates to certain novel intermediates obtained during the process.

The compounds of the above formula are useful as tranquilizers. For example, they exhibit anti-anxiety and sedative activity without undesirable side-effects as hypnosis. In addition, they are useful as intermediates for the production of other substituted benzodiazepines.

In accordance with our invention, these substiuted 1,4-benzodiazepines are prepared by the following sequence of steps.

Step I of our novel process comprises treating a 2-aminohalobenzophenone such as 2-amino-5-chlorobenzophenone:

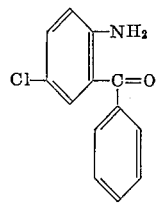

dissolved in a mixture of tetrahydrofuran and triethylamine with an equal molar ratio of the desired cycloalkanecarboxylic acid chloride such as, for example, cyclopropanecarboxylic acid chloride, followed by refluxing the resulting reaction mixture to yield a 2-cyclopropylcarbonylamido-5-chlorobenzophenone of the formula:

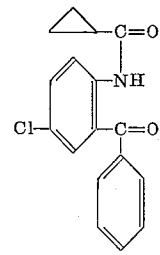

The above reaction product can be readily separated from the mother liquor by removal of the solvents.

Step II comprises reducing the compound obtained in accordance with step I with an excess of a reducing agent such as lithium aluminum hydride followed by aqueous hydrolysis to form the corresponding 2-cycloalkylmethyl-aminohalobenzhydrol such as, for example, 2-cyclopropylmethylamino-5-chlorobenzhydrol having the following structural formula:

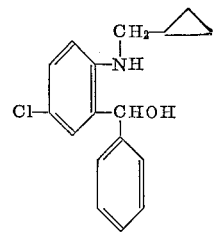

Step III comprises oxidizing the benzhydrol group of the product of step II with an excess of manganese dioxide to yield, for example, 2-cyclopropylmethylamino-5-chlorobenzophenone of the formula:

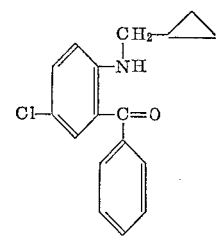

Step IV comprises the preparation of a phthalimidoacetyl derivative of the product obtained in accordance with step III. For example, 2-(N-phthalimidoacetyl-N-cyclopropylmethyl)-amino-5-chlorobenzophenone of the formula:

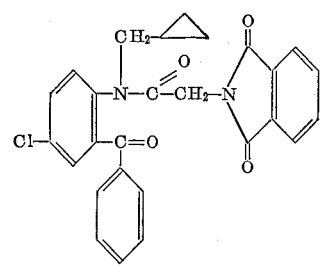

may be prepared by refluxing one mole of 2-cyclopropylmethylamino-5-chlorobenzophenone (obtained in step III) in tetrahydrofuran with two moles of phthalimidoacetyl chloride. The reaction product is readily obtained by removal of the solvent.

Step V, the final step, comprises the ring closure with hydrazine hydrate of the phthalimidoacetyl derivatives obtained in accordance with step IV thus forming the novel compounds of this invention. Thus, for example, when a solution of 2-(N-phthalimidoacetyl-N-cyclopropylmethyl)-amino-5-chlorobenzophenone in a mixture of chloroform and ethanol is reacted with an excess of hydrazine hydrate to give a compound of the formula:

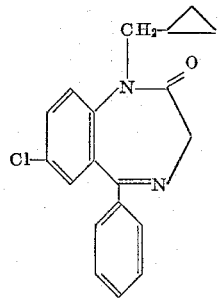

the ring closure reaction can be effected at ambient temperature and usually takes about 16 to 24 hours for completion. The desired reaction product may be recovered from the mother liquor by removal of the solvent.

Room temperature as referred to hereinafter indicates a temperature of 20° to 25° C.

The following examples are given in order further to illustrate the invention.

EXAMPLE 1

*2-cyclopropylcarbonylamido-5-chlorobenzophenone*

To 400.5 g. (1.73 moles) of 2-amino-5-chlorobenzophenone dissolved in 220 g. (2.18 moles) of triethylamine and 3.5 liters of tetrahydrofuran is added cautiously 181 g. (1.73 moles) of cyclopropanecarboxylic acid chloride. The reaction is refluxed 2½ hours and allowed to cool to room temperature. The solvent is then removed under vacuum to obtain 2-cyclopropylcarbonylamido-5-chlorobenzophenone as a residue which is dissolved in 1 liter of methylene chloride, washed twice with 5% hydrochloric acid, and then twice with 10% potassium hydroxide. The methylene chloride solution is then dried over anhydrous magnesium sulfate, filtered and the solvent removed under vacuum. The residue is recrystallized from 1500 ml. of methanol, charcoaling the hot solution to give 356 g. of 2-cyclopropylcarbonylamido - 5 - chlorobenzophenone, M.P. 105°–105.5° C. (69% yield), containing in the infrared a single unresolved carbonyl band at 1670 cm.$^{-1}$.

EXAMPLE 2

*2-cyclopropylmethylamino-5-chlorobenzhydrol*

To a slurry of 94.8 g. (2.47 moles) of lithium aluminum hydride in 1.2 liters of tetrahydrofuran is added with stirring a solution of 356 g. (1.18 moles) of 2-cyclopropylcarbonyl - amido - 5 - chlorobenzophenone in 1.8 liters of tetrahydrofuran. The addition takes 80 minutes while maintaining gentle refluxing, and the reaction mixture is then refluxed overnight and allowed to cool to room temperature over a period of 3 days. The complex formed in the reaction mixture is then hydrolyzed with water. During the hydrolysis, 500 milliliters of tetrahydrofuran is added to facilitate stirring. At a point where the flocculate white precipitate settles quickly when stirring is interrupted, the mixture is filtered, the filter cake washed with solvent, the combined filtrates dried over magnesium sulfate, filtered and the solvent removed under vacuum to obtain 2 - cyclopropylmethylamino - 5 - chlorobenzhhydrol as a residue. The residue is recrystallized from 1300 ml. of Skelly B, giving 315 g. of 2 - cyclopropylmethylamino - 5 - chlorobenzhydrol, M.P. 85°–85.5° C. (93% yield).

*Analysis.*—Calcd.: C, 70.95; H, 6.30; Cl, 12.32. Found: C, 70.80; H, 6.45; Cl, 12.31, 12.44.

EXAMPLE 3

*Preparation of 2-cyclopropylmethylamino-5-chlorobenzophenone*

To a solution of 315 g. (1.09 moles) of 2-cyclopropylmethylamino - 5 - chlorobenzhydrol in 4 liters of benzene is added 453.6 g. (5.22 moles) of manganese dioxide, freshly prepared according to the method of Attenburrow et al., J.C.S. 1952, 1104. The mixture is then refluxed for 1¼ hours, filtered, and the filtrate evaporated under vacuum. The reddish residue is recrystallized from 510 ml. of 90% acetone—10% water, giving 181 g. of pure 2 - cyclopropylmethylamino - 5 - chlorobenzophenone, M.P. 79°–80° C. (58% yield). Upon concentration of the mother liquor a second crop of 2-cyclopropylmethylamino - 5 - chlorobenzophenone weighing 34.1 g. and melting at 76.5°–78° C. are obtained.

*Analysis.*—Calcd.: C, 71.45; H, 5.64; Cl, 12.41. Found: C, 71.67; H, 5.82; Cl, 12.68, 12.71.

EXAMPLE 4

*Preparation of 2(N-phthalimidoacetyl-N-cyclopropylmethyl)-amino-5-chlorobenzophenone*

To a solution of 36.0 g. (0.126 mol) of 2-cyclopropylmethylamino - 5 - chlorobenzophenone in 500 ml. of tetrahydrofuran is added 50.7 g. (0.252 mole) of phthalimidoacetyl chloride. The resulting solution is refluxed for 16 to 24 hours, the solvent removed under vacuum, the residual oil crystallized from 200 ml. of ethanol and recrystallized from 500 ml. of 80% ethanol- 20% tetrahydrofuran giving 44.7 g. of 2(N - phthalimidoacetyl-N - cyclopropylmethyl) - amino - 5 - chlorobenzophenone, M.P. 163°–164° C. (75% yield).

*Analysis.*—Calcd.: C, 68.57; H, 4.48; N, 5.92. Found: C, 68.36; H, 4.29; N, 5.85.

EXAMPLE 5

*Preparation of 1-cyclopropylmethyl-5-phenyl-7-chloro-1H-1,4-benzodiazepine-2(3H)-one*

To a solution of 39.5 g. (0.0845 mole) of 2 - (N-phthalimidoacetyl - N - cyclopropylmethyl)amino - 5-chlorobenzophenone in a mixture of 423 ml. of chloroform and 423 ml. of ethanol is added 9.52 g. (0.1903 mole) of hydrazine hydrate and 9.52 ml. of water. This solution is allowed to stand at room temperature. In three hours a precipitate begins to form in the solution. After standing 16 to 24 hours a voluminous pulpy white precipitate forms. The solvents are removed under vacuum while keeping the temperature under 40° C. and the residue is partitioned between dilute ammonia water and ether. The aqueous layer is separated and washed with ether, the ether extracted with 5% hydrochloric acid, the acidic solution is made basic with 10% sodium hydroxide and again extracted with ether. Since some spontaneous crystallization occurs in the ether, the solvent is removed without drying under vacuum and the residue is recrystallized from 35 ml. of ethanol giving 18.0 of 1-cyclopropylmethyl-5-phenyl-7-chloro-1H-1,4-benzodiazepine-2(3H)one, M.P. 145°–146° C. (65% yield).

*Analysis.*—Calcd.: C, 70.25; N, 5.28; H, 8.62. Found: C, 70.35; N, 5.41; H, 8.42.

It is understood that the foregoing detailed description is given merely by way of illustration and that many variations may be made therein without departing from the spirit of our invention.

Having described our invention, what we desire to secure by Letters Patent is:

1. A compound of the formula:

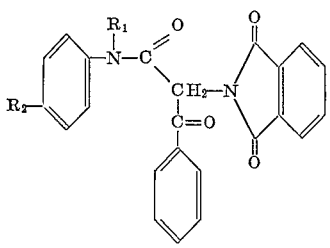

in which $R_1$ is a member selected from the group consisting of cyclopropylmethyl, cyclobutylmethyl and cyclopentylmethyl and $R_2$ is a member of the group consisting of hydrogen, halogen, lower alkyl and lower alkoxy.

2. 2 - (N - phthalimidoacetyl - N - cyclopropylmethyl) amino - 5 - chlorobenzophenone.

References Cited by the Examiner

Dyer et al.: Jour. Org. Chem., vol. 26, 1961, pp. 1321–1323.

ALEX MAZEL, *Primary Examiner.*

M. U. O'BRIEN, *Assistant Examiner.*